(12) United States Patent
Hubert et al.

(10) Patent No.: US 9,500,223 B2
(45) Date of Patent: Nov. 22, 2016

(54) ASYMMETRICAL TAPERED ROLLER BEARING FOR THE PURPOSE OF MOUNTING A GEARWHEEL ON A GEARSHAFT

(71) Applicant: Schaeffler Technologies AG & Co. KG, Herzogenaurach (DE)

(72) Inventors: Thomas Hubert, Hagenbuechach (DE); Sven Hofmann, Heroldsberg (DE);
(Continued)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/780,185

(22) PCT Filed: Jun. 30, 2014

(86) PCT No.: PCT/DE2014/200286
§ 371 (c)(1),
(2) Date: Sep. 25, 2015

(87) PCT Pub. No.: WO2015/014356
PCT Pub. Date: Feb. 5, 2015

(65) Prior Publication Data
US 2016/0053805 A1    Feb. 25, 2016

(30) Foreign Application Priority Data

Jul. 30, 2013    (DE) .......................... 10 2013 214 869

(51) Int. Cl.
*F16C 19/38*    (2006.01)
*F16C 33/58*    (2006.01)
(Continued)

(52) U.S. Cl.
CPC ........... *F16C 19/386* (2013.01); *F16C 19/505* (2013.01); *F16C 33/585* (2013.01); *F16C 35/063* (2013.01);
(Continued)

(58) Field of Classification Search
CPC .................. F16F 19/385; F16C 19/541; F16C 19/547; F16C 33/366; F16C 2240/34;
(Continued)

(56) References Cited

U.S. PATENT DOCUMENTS 3,885,842 A * 5/1975 Furutsu ................. F16C 19/388
384/468
4,158,972 A * 6/1979 Chamberlain ............ F16H 1/46
475/331
(Continued)

FOREIGN PATENT DOCUMENTS

DE         19960542         8/2000
DE         19960542 A1 *    8/2000    ............ F16C 19/386
(Continued)

*Primary Examiner* — Marcus Charles
(74) *Attorney, Agent, or Firm* — Simpson & Simpson, PLLC

(57) ABSTRACT

A bearing assembly for a transmission of a vehicle, including: a gearwheel; a gearshaft; and a double-row, asymmetrical tapered roller bearing arranged between the gearwheel and the gearshaft, in an O arrangement and including a first row of tapered rollers, which adjoins a shaft end and a second row of tapered rollers, which adjoins the first row of tapered rollers. The first and second rows of tapered rollers are arranged between a shared outer ring arranged on the gearwheel and separate, dedicated inner rings arranged on the gearshaft. A first acute contact angle on the first row of tapered rollers is not equal to a second acute contact angle on the second row of tapered rollers. The first contact angle is at least 3° less than the second contact angle. A difference
(Continued)

between the second contact angle and the first contact angle is at most 10°.

8 Claims, 1 Drawing Sheet

(72) Inventors: Alexander Pabst, Eckental (DE);
Frank Schoenstein, Baiersdorf (DE)

(51) Int. Cl.
*F16C 35/06* (2006.01)
*F16C 19/50* (2006.01)
*F16C 35/063* (2006.01)

(52) U.S. Cl.
CPC ........ *F16C 2240/34* (2013.01); *F16C 2361/61* (2013.01)

(58) Field of Classification Search
CPC .............. F16C 2240/40; F16C 2323/01; F16C 2361/61; F16C 35/063
USPC ....... 384/499, 513, 559, 564–565, 571, 593, 384/619, 569, 570
See application file for complete search history.

(56) References Cited

U.S. PATENT DOCUMENTS

| | | | | |
|---|---|---|---|---|
| 4,223,570 A * | 9/1980 | Yamamori | ............ | F16C 19/548 384/565 |
| 4,333,695 A * | 6/1982 | Evans | .................... | B60B 27/001 384/562 |
| 5,286,117 A * | 2/1994 | Wojan | .................... | F16C 19/364 384/513 |
| 5,852,947 A * | 12/1998 | Tsujimoto | ............. | F16C 19/386 192/110 B |
| 5,975,762 A * | 11/1999 | Ai | ............................ | F16C 19/38 384/450 |
| 7,036,989 B2 * | 5/2006 | Taki | ....................... | F16C 19/386 384/462 |
| 2010/0001574 A1 * | 1/2010 | Bechem | .................. | E21C 27/22 299/10 |
| 2010/0285890 A1 * | 11/2010 | Dougherty | ............ | B60B 27/001 464/137 |
| 2012/0040797 A1 * | 2/2012 | Fox | ......................... | F16C 19/38 475/347 |
| 2015/0038279 A1 * | 2/2015 | Hilker | ..................... | F16H 48/38 475/246 |

FOREIGN PATENT DOCUMENTS

| | | | | |
|---|---|---|---|---|
| DE | 102009026709 | | 12/2010 | |
| DE | 102009026710 | | 12/2010 | |
| EP | 1321687 | | 6/2003 | |
| EP | 2769781 A1 * | | 8/2014 | .............. F16C 33/64 |
| JP | 2008169957 A * | | 7/2008 | .............. F16C 43/04 |
| WO | WO 2007016336 A2 * | | 2/2007 | .............. F03D 11/02 |
| WO | WO2008/134415 | | 11/2008 | |

* cited by examiner

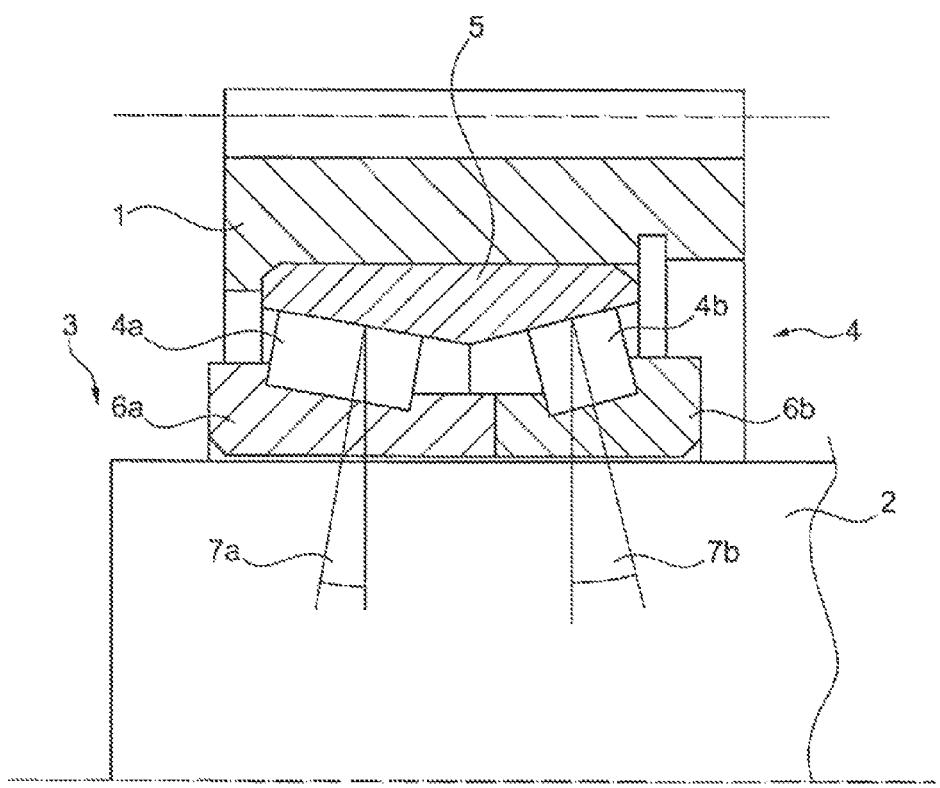

ASYMMETRICAL TAPERED ROLLER BEARING FOR THE PURPOSE OF MOUNTING A GEARWHEEL ON A GEARSHAFT

CROSS-REFERENCE TO RELATED APPLICATIONS

The present application is the U.S. National Stage Application pursuant to 35 U.S.C. §371 of International Application No. PCT/DE2014/200286, filed Jun. 30, 2014, which application claims priority from German Patent Application No. 10 2013 214 869.0, filed Jul. 30, 2013, which applications are incorporated herein by reference in their entireties,

TECHNICAL FIELD

The present disclosure broadly describes a bearing assembly for a gearing, for the purpose of mounting a gearwheel on a gearshaft, having an asymmetrical double-row tapered roller bearing in an O-shaped arrangement. The bearing has a first row of tapered rollers, which sits on a shaft end, and a second row of tapered rollers which adjoins the first row of tapered rollers. The two rows of tapered rollers are arranged between a shared outer ring arranged on the gearwheel and a separate inner ring arranged on the gearshaft. A first acute contact angle on the first row of tapered rollers is not equal to a second acute contact angle on the second row of tapered rollers.

In an example embodiment, the bearing assembly is for automatic transmissions, for example for planetary drives which are used in automobile construction. Such transmissions can be used for the final drive. Forces and torques are transmitted to a differential cage via an output end driven by a gearshaft. The gearshaft typically has an adjusted bearing arrangement.

BACKGROUND

Gearshafts vehicle transmissions which are mounted by means of a double-row angular contact ball bearing in an O arrangement are known. For example, DE 10 2009 026 709 A1 and DE 10 2009 026 710 A1 disclose arrangements in a planetary drive which have such a bearing assembly. Bearing assemblies are likewise known which have a double-row tapered roller bearing. By way of example, EP 1 321 687 B1 discloses a bearing assembly of a pinion gear which is borne on a fixed part in the manner of a cantilever by a double-row tapered roller bearing.

SUMMARY

The bearing assembly includes a pinion shaft, which includes a pinion, a first row of tapered rollers which adjoin the pinion and a second row of tapered rollers which are further from the pinion with respect to the first row of tapered rollers. An inner ring forms the first raceway surfaces and is attached to the pinion shaft. An outer ring forms the second raceway surfaces and is attached to the fixed part.

The first row of tapered rollers, as well as the second row of tapered rollers, are arranged between the first and the second raceway surfaces. The contact angle of the first row of tapered rollers is determined on one side by an acute contact angle between the first row of tapered rollers and the second raceway surface and on the other side by the axle of the pinion. The contact angle of the second row of tapered rollers is determined on one side by an acute contact angle between the second row of tapered rollers and the second raceway surface and on the other side by the axle of the pinion. In order to improve the rigidity of the bearing and the service fife thereof the contact angle of the first row of tapered rollers on the pinion shaft is selected such that it is greater than the contact angle of the second row of tapered rollers on the pinion shaft. In an example embodiment, the contact angle of the first row of the tapered rollers is given a value greater than 23° and the contact angle of the second row of tapered rollers is given a value less than 23°.

The problem addressed by the bearing assembly described in the present disclosure is that of further improving a bearing assembly for the purpose of mounting a gearwheel on a gearshaft by further increasing the load rating and thereby the service life of the bearing assembly.

In an example embodiment, the first contact angle is at least 3° less than the second contact angle. A unexpected result has shown that the difference between the two contact angles must be at least a value of 3° in order to ensure a sufficient imbalance of the load in the radial and axial directions, thereby making it possible to improve the load rating and therefore the service life of the tapered roller bearing. In this way, the holding capacity of the tapered roller bearing for axial and radial forces is significantly improved.

In an example embodiment, the difference between the second contact angle and the first contact angle is no more than 10°. In other words, the first contact angle is at most 10° less than the second contact angle. If this maximum difference between the two contact angles is exceeded, the imbalance of the load of the tapered roller bearing is too great and the load rating, and therefore also the service life, of the tapered roller bearing is reduced.

In an example embodiment, depending on the axial and radial forces which are anticipated, the first contact angle is at least 15°, but at most 21°, and the second contact angle is at least 20° and at most 26°.

In an example embodiment, the first contact angle is 18.09° and the second contact angle is 23.5°. These values for the two contact angles enable an advantageously long service life.

In an example embodiment, an axial width of the tapered rollers of the first row is between 25% and 40% greater than an axial width of the tapered rollers of the second row. The axial width of the tapered rollers of the first row is, for example, 6.5 to 7.1 cm and the axial width of the tapered rollers of the second row is, for example, 4.8 to 5.4 cm, The imbalance of the load between the two rows of tapered rollers results in forces of different magnitudes which act on the tapered rollers in each of the rows. In an example embodiment, to further increase the service life of the bearing assembly, it is advantageous to match the size of the tapered rollers, as described above, to the load.

BRIEF DESCRIPTION OF THE DRAWINGS

Various embodiments are disclosed, by way of example only, with reference to the accompanying schematic drawings in which corresponding reference symbols indicate corresponding parts, in which:

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1 is a partial cross-sectional view of a bearing assembly for a transmission of a vehicle. The bearing assembly shown in FIG. 1 includes double-row asymmetrical tapered roller bearing 4, which is arranged between gearwheel 1 and gearshaft 2. Tapered roller bearing 4 has row of tapered rollers 4a and row of tapered rollers 4b. Rows of tapered rollers 4a, 4b roll between shared outer ring 5 and separate, dedicated inner rings 6a, 6b.

Outer ring 5 is arranged on gearwheel 1 and inner rings 6a, 6b are arranged on gearshaft 2. Row of tapered rollers 4a sits on shaft end 3 of gearshaft 2. In other words, in the longitudinal direction of gearshaft 2, after shaft end 3, row of tapered rollers 4a comes first, followed by row of tapered rollers 4b. In an example embodiment: contact angle 7a on row of tapered rollers 4a has a value of 18.09°; and contact angle 7b on row of tapered rollers 4b has a value of 23.5°. Tapered rollers 4a are larger than tapered rollers 4b by, tier example, a third.

LIST OF REFERENCE NUMBERS 1 gearwheel
2 gearshaft
3 shaft end
4 tapered roller bearing
4a, 4b tapered rollers
5 outer ring
6a, 6b inner ring
7a, 7b contact angle

The invention claimed is:

1. A bearing assembly for a transmission of a vehicle, comprising:
   a gearwheel;
   a gearshaft; and,
   a double-row, asymmetrical tapered roller bearing between the gearwheel and the gearshaft in an O arrangement, the tapered roller bearing including:
      a first plurality of tapered rollers, having a first size; and,
      a second plurality of tapered rollers having a second size, less than the first size and which adjoins the first plurality of tapered rollers, wherein:
   the first and second pluralities of tapered rollers are arranged between:
      a shared outer ring arranged on the gearwheel; and,
      first and second separate, dedicated inner rings, respectively, arranged on the gearshaft;
   a first acute contact angle on the first plurality of tapered rollers is not equal to a second acute contact angle on the second plurality of tapered rollers;
   the first contact angle is at least 3° less than the second contact angle; and,
   a difference between the second contact angle and the first contact angle is at most 10°.

2. The bearing assembly according to claim 1, wherein the first contact angle is at least 15°, but at most 21°.

3. The bearing assembly according to claim 1, wherein the first contact angle is 18.09°.

4. The bearing assembly according to claim 1, wherein the second contact angle is at least 20°, but at most 26°.

5. The bearing assembly according to claim 1, wherein the second contact angle is 23.5°.

6. The bearing assembly according to claim 1, wherein the gearwheel is designed as a drive gear or a gearwheel.

7. The bearing assembly according to claim 1, wherein an axial width of the first plurality of tapered rollers is between 25% and 40% greater than an axial width of the second plurality of tapered rollers.

8. A planetary drive for a vehicle, having a bearing assembly according to claim 1.

* * * * *